United States Patent [19]

Jonas et al.

[11] Patent Number: 4,959,430
[45] Date of Patent: Sep. 25, 1990

[54] POLYTHIOPHENES, PROCESS FOR THEIR PREPARATION AND THEIR USE

[75] Inventors: Friedrich Jonas, Aachen; Gerhard Heywang, Bergisch Gladbach; Werner Schmidtberg, Leverkusen; Jürgen Heinze; Michael Dietrich, both of Freiburg, all of Fed. Rep. of Germany

[73] Assignee: Bayer Aktiengesellschaft, Leverkusen, Fed. Rep. of Germany

[21] Appl. No.: 337,498

[22] Filed: Apr. 13, 1989

[30] Foreign Application Priority Data

Apr. 22, 1988 [DE] Fed. Rep. of Germany ....... 3813589
Dec. 23, 1988 [DE] Fed. Rep. of Germany ....... 3843412

[51] Int. Cl.$^5$ ............................................. C08F 28/06
[52] U.S. Cl. ....................................... 526/257; 57/901; 429/212; 528/373; 528/378; 528/379
[58] Field of Search ................. 526/257; 528/378, 379

[56] References Cited

U.S. PATENT DOCUMENTS 4,521,589 6/1985 Yamamoto et al. ................ 528/379
4,892,678 1/1990 Tanaka et al. ...................... 526/257

FOREIGN PATENT DOCUMENTS 0203438 12/1986 European Pat. Off. .
0206133 12/1986 European Pat. Off. .
0253594 1/1988 European Pat. Off. .
0257573 3/1988 European Pat. Off. .

*Primary Examiner*—Morton Foelak
*Attorney, Agent, or Firm*—Sprung Horn Kramer & Woods

[57] ABSTRACT

The invention relates to new polythiophenes containing structural units of the formula

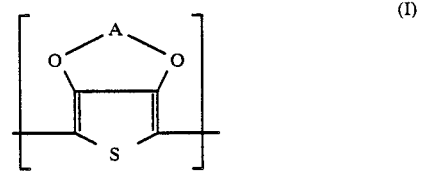

in which
  A denotes an optionally substituted $C_1$–$C_4$-alkylene radical, their preparation by oxidative polymerization of the corresponding thiophenes and the use of the polythiophenes for imparting antistatic properties on substrates which only conduct electrical current poorly or not at all, in particular on plastic mouldings, and as electrode material for rechargeable batteries.

4 Claims, 2 Drawing Sheets

POLYTHIOPHENES, PROCESS FOR THEIR PREPARATION AND THEIR USE

The invention relates to new polythiophenes of high electrical conductivity, their preparation by oxidative polymerization of the corresponding thiophenes, and the use of the polythiophenes for imparting antistatic properties on substrates which only conduct electrical current poorly or not at all, in particular on plastic mouldings, and as electrode material for rechargeable batteries.

Polythiophenes, their preparation by electrochemical or chemical oxidation of the corresponding thiophenes, and the use of the polythiophenes for imparting antistatic properties on substrates which only conduct electrical current poorly or not at all are known; see, for example:

(a) EP-A-0,206,133;
   This discloses a process for applying coatings of conductive, polymeric heterocyclic compounds produced with the aid of oxidants onto substrates which conduct electrical current only poorly or not at all. However, only the imparting of antistatic properties on substrates by means of polypyrrole produced on the substrates by oxidative polymerization of pyrrole is described;

(b) EP-A-0,253,594;
   This publication describes specific thiophenes substituted in the 3- and/or 4-position by (substituted) alkyl and/or alkoxy groups and the electroconductive polymers obtained from them by chemical or electrochemical oxidation. According to the data given in the publication, the polythiophenes obtained by chemical oxidation only have poor conductivity;

(c) U.S. Pat. No. 4,521,589;
   This publication describes the preperation of polymeric 3-alkylthiophenes by reacting 3-alkyl-2,5-dihalogeno-thiophenes with magnesium in the presence of nickel compounds in inert organic solvents. The electroconductivity of the undoped polythiophenes obtained in this way is given as being $9 \times 10^{-14}$ S/cm;

(d) EP-A-0,203,438 and EP-A-0,257,573;
   Both publications concern the preparation of substituted conductive polythiophenes which are soluble in organic solvents, and the use of the solutions of these soluble polythiophenes for imparting antistatic properties on substrates which only conduct electrical current poorly or not at all. The preparation of the soluble, substituted, conductive polythiophenes or solutions thereof is carried out by electrochemical oxidation of the corresponding substituted thiophenes (EP-A 257,573) or by reacting the corresponding 2,5-dihalogenothiophenes with magnesium in the presence of nickel catalysts (EP-A 203,438); the last-mentioned process is virtually impossible to carry out on an industrial scale, and the polythiophenes obtained by electrochemical oxidation only have very low conductivity.

Surprisingly, it has been found that a specific type of 3,4-disubstituted polythiophenes is particularly suitable for imparting antistatic properties on substrates which only conduct electrical current poorly or not at all, since it has a high electroconductivity and since, in addition, it can be prepared directly on the substrates to be provided with antistatic properties by chemical oxidation of the parent 3,4-disubstituted thiophenes using customary oxidants. This is because it has been found that the polymerization rates of the specific thiophenes can be varied through the choice of oxidant and, in particular, can be adjusted so that it is no longer necessary to apply the oxidant and substituted thiophenes separately to the substrate to be provided with antistatic properties, as has hitherto been necessary in the case of provision of antistatic properties using polypyrrole, but instead so that it is possible to apply the substituted thiophenes and oxidants to the substrates to be treated in combined form together in a solution of printing paste.

The invention therefore relates to polythiophenes containing structural units of the formula

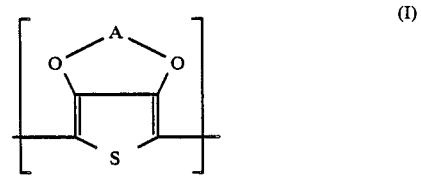

(I)

in which
   A denotes an optionally substituted $C_1$–$C_4$-alkylene radical, preferably an optionally alkyl-substituted methylene radical, an optionally $C_1$–$C_{12}$-alkyl- or phenyl-substituted 1,2-ethylene radical or a 1,2-cyclohexylene radical.

The polythiophenes are preferably built up from structural units of formula (I).

Representatives of the optionally substituted $C_1$–$C_4$-alkylene radicals which may be mentioned are preferably the 1,2-alkylene radicals which are derived from 1,2-dibromo-alkanes, as can be obtained on bromination of α-olefins, such as ethene, 1-propene, 1-hexene, 1-octene, 1-decene, 1-dodecene and styrene; in addition, the 1,2-cyclohexylene, 2,3-butylene, 2,3-dimethylene-2,3-butylene and 2,3-pentylene radical may be mentioned. Preferred radicals are the methylene, 1,2-ethylene and 1,2-propylene radical.

The invention furthermore relates to a process for the preparation of these polythiophenes; the process is characterized in that 3,4-disubstituted thiophenes of the formula

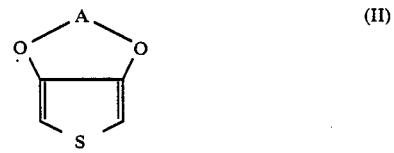

(II)

in which
   A has the meaning indicated under formula (I), are polymerized in an organic solvent which is inert under the reaction conditions used either by using oxidants which are suitable for oxidative polymerization of pyrrole or electrochemically.

The oxidative polymerization by chemical means is surprising inasmuch as EP-A-0,206,133 describes pyrrole and thiophene as monomers which can be oxidized in the same way, but it has been shown that thiophene cannot be polymerized by oxidants which are suitable for oxidative polymerization of pyrrole, for example $FeCl_3$.

The polythiophenes according to the invention built up from structural units of the formula (I) are excellently suitable for imparting antistatic properties on substrates which only conduct electrical current poorly or not at all. The polythiophenes according to the invention are preferably produced directly on the substrates to be provided with antistatic properties, by the abovementioned preparation process.

The invention therefore furthermore relates to a process for imparting antistatic properties on substrates which only conduct electrical current poorly or not at all, in particular on plastic mouldings, by applying a coating of electroconductive organic polymer onto the surface of the substrates; the process is characterized in that a coating of polythiophenes built up from structural units of the formula

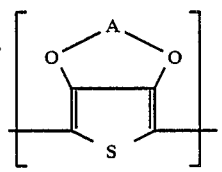

in which

A denotes an optionally substituted $C_1$–$C_4$-alkylene radical, preferablly an optionally alkyl-substituted methylene radical, an optionally $C_1$–$C_{12}$-alkyl- or phenyl-substituted 1,2-ethylene radical or a 1,2-cyclohexylene radical, is produced on the surface of the substrates by oxidative polymerization.

The 3,4-disubstituted thiophenes of the formula (II) which are necessary for the preparation are either known or can be obtained by processes known in principle by reacting the alkali metal salts of 3,4-dihydroxy-thiophene-2,5-dicarboxylic esters with the appropriate alkylene vic-dihalides and subsequently decarboxylating the free 3,4-(alkylene-vic-dioxy-)thiophene-2,5-dicarboxylic acids (see, for example, Tetrahedron 1967 Vol. 23, 2437–2441 and J. Am. Chem. Soc. 67 (1945) 2217–2218).

The oxidative polymerization of the 3,4-disubstituted thiophenes of the formula (II) by chemical oxidation is generally carried out at temperatures from −10° to +250° C., preferably at temperatures from 0° to 200° C., depending on the oxidant used and on the reaction time desired.

Particular examples which may be mentioned of organic solvents which are inert under the reaction conditions are: aliphatic alcohols, such as methanol, ethanol and propanol; aliphatic ketones, such as acetone and methyl ethyl ketone; aliphatic carboxylic esters, such as ethyl acetate and butyl acetate; aromatic hydrocarbons such as toluene and xylene; aliphatic hydrocarbons, such as hexane, heptane and cyclohexane; chlorinated hydrocarbons, such as dichloromethane and dichloroethane; aliphatic nitriles, such as acetonitrile; aliphatic sulphoxides and sulphones, such as dimethyl sulphoxide and sulpholane; aliphatic carboxamides, such as methylacetamide and dimethylformamide; aliphatic and araliphatic ethers, such as diethyl ether and anisole. In addition, water or mixtures of water with the abovementioned organic solvents can also be used as solvents.

The oxidants used are the oxidants suitable for oxidative polymerization of pyrrole; these are described, for example, in J. Am. Chem. Soc. 85, 454 (1963). For practical reasons, oxidants which are inexpensive and easy to handle, such as iron(III) salts, such as $FeCl_3$, $Fe(ClO_4)$ and the iron(III) salts of organic acids and of inorganic acids containing organic radicals, furthermore $H_2O_2$, $K_2Cr_2O_7$, alkali metal persulphates, ammonium persulphates, alkali metal perborates and potassium permanganate, are preferred.

Theoretically 2.25 equivalents of oxidant are required per mole of thiophene for the oxidative polymerization of the thiophenes of the formula II. (See, for example, J. Polym. Sci. Part A Polymer Chemistry Vol. 26, page 1287 (1988)). In practice, however, the oxidant is applied in a certain excess, e.g. an excess of 0.1 to 2 equivalents per mole of thiophene.

The use of persulphates and iron(III) salts of organic acids and of inorganic acids containing organic radicals has the great applicational advantage that they are non-corrosive and, in particular, that, when they are used, the oxidation of the 3,4-disubstituted thiophenes of the formula (II) proceeds so slowly that the thiophenes and oxidants can be applied together from one solution or one printing paste onto the substrate to be provided with antistatic properties. After application of the solution or the paste, the oxidation is accelerated by warming the coated substrate.

When the other abovementioned oxidants such as $FeCl_3$, $H_2O_2$ or perborates are used, the oxidative polymerization proceeds so rapidly that it is necessary to apply the oxidants and thiophenes separately to the substrate to be treated, but, in contrast, warming is no longer necessary.

Examples which may be mentioned of iron(III) salts of inorganic acids containing organic radicals are the iron(III) salts of the sulphuric acid monoesters of $C_1$–$C_{20}$-alkanols, for example the Fe(III) salt of lauryl sulphate.

Examples which may be mentioned of iron(III) salts of organic acids are: the Fe(III) salts of $C_1$–$C_{20}$-alkylsulphonic acids, such as of methane- and dodecanesulphonic acid; of aliphatic $C_1$–$C_{20}$-carboxylic acids, such as of 2-ethylhexylcarboxylic acids; of aliphatic perfluorocarboxylic acids, such as of trifluoroacetic acid and of perfluorooctanoic acid; of aliphatic dicarboxylic acids, such as of oxalic acid and, in particular, of aromatic sulphonic acids, optionally substituted by $C_1$–$C_{20}$-alkyl groups, such as of benzenesulphonic acid, p-toluenesulphonic acid and of dodecylbenzenesulphonic acid.

It is also possible to apply mixtures of these abovementioned Fe(III) salts of organic acids.

If thiophene and oxidant are applied separately, the substrate to be provided with antistatic properties may be treated firstly with the solution of thiophene and then with the solution of the oxidant or firstly with the solution of the oxidant and then with the solution of thiophene. If thiophene and the oxidant are applied together, the substrate to be treated is only coated with one solution containing thiophene and oxidant. Since a portion of the thiophene evaporates during this joint application the oxidant is added to the solutions in an amount which is reduced in accordance with the anticipated loss of thiophene.

In addition, the solutions may contain organic binders which are soluble in organic solvents, such as poly(vinyl acetate), polycarbonate, poly(vinyl butyrate), polyacrylates, polymethacrylates, polystyrene, polyacrylonitrile, poly(vinyl chloride), polybutadiene, polyisoprene, polyethers, polyesters, silicones and pyrrole/a- crylate, vinyl acetate/acrylate and ethylene/vinyl acetate copolymers which are soluble in organic solvents. It is also possible to use water-soluble binders, such as poly(vinyl alcohols) as thickeners.

The solutions to be applied to the substrates to be treated preferably contain 1 to 30% by weight of the thiophene derivative of the formula (II) and 0 to 30% by weight of binder, both percentages by weight relating to the total weight of the solution.

The solutions are applied to the substrates by known processes, for example by spraying, knife coating, brushing or printing.

Specific examples of substrates which may be provided with antistatic or electroconductive properties by the process according to the invention are mouldings made from organic plastics, in particular films made from polycarbonates, polyamides, polyethylenes, polypropylenes, poly(vinyl chloride) and polyesters, but it is also possible to provide inorganic materials, for example ceramics, such as aluminum oxide, silicon dioxide and glass, with antistatic properties by the process according to the invention.

The coating thickness of the applied coating after drying is generally 0.1 to 100 μm, depending on the conductivity desired and on the coating transparency desired.

Removal of the solvents after application of the solutions can be effected by simple evaporation at room temperature. In order to achieve higher processing rates, however, it is more advantageous to remove the solvents at elevated temperature, for example at temperatures from 20° up to 250° C., preferably 40° up to 200° C. Removal of the solvents at elevated temperature is also more advantageous since it has been found that the electroconductivity of the antistatic coating can be substantially increased, namely by up to power of ten, by thermal aftertreatment of the coatings at temperatures of from 50° to 250° C., preferably from 100° to 200° C. The thermal aftertreatment can be combined directly with removal of the solvent or alternatively carried out at an interval after production of the antistatic coating.

The duration of the heat treatment is 5 seconds to 5 minutes, depending on the shape and material of the coated plastic mounding and on the type of polymer used for the coating.

The heat treatment may, for example, be carried out by moving the coated plastic moulding through a heat chamber at the desired temperature at a rate such that the residence time desired at the selected temperature is achieved, or bringing the coated plastic moulding into contact with a hotplate at the desired temperature for the desired residence time.

When the process according to the invention is used for imparting antistatic properties on plastic films, an embodiment which is particularly interesting in industry comprises combining the heat treatment of the coated films with mechanical deformation of the films. Simultaneous heat treatment and mechanical deformation of this type takes place in the production of plastic mouldings from plastic films by thermoforming the films.

After removal of the solvents (drying) and before the thermal aftertreatment, it may be advantageous to wash the excess oxidant out of the coating using water.

With the aid of the process according to the invention for imparting antistatic properties, adherent and mechanically resistant coatings having surface resistances up to 1Ω can be obtained in a simple manner.

A particularly advantageous embodiment of the process according to the invention for imparting antistatic properties on plastic mouldings, in particular plastic films, comprises, with separate application of thiophene and oxidant, initially coating the plastic moulding to be provided with antistatic properties with a solution of the oxidant in an organic solvent containing a water-insoluble or sparingly-soluble organic binder, removing the organic solvent from this coating, treating the oxidant-coated plastic moulding with a solution of thiophene in an organic solvent which dissolves neither the plastic material to be provided with antistatic properties nor the binder and oxidant applied to the plastic surface; after this treatment, also removing the organic solvent from the coating applied to the moulding, and finally freeing the coating thus obtained from inorganic compounds which are not polymerically bound, for example unused oxidant, by washing with water.

In the case where thiophene and the oxidant are applied together, the coating obtained after removal of the solvent is washed with water, in particular when the oxidant used was iron(III) salts and when these iron salts interfere in the coating when the antistatic plastic mouldings are used further; this is the case, in particular, when antistatic films are used for packing electronic components.

The process according to the invention is particularly suitable for the production of antistatic plastic films, for example from polyesters, polycarbonates and polyamides. Due to their transparency and durable antistatic properties, even under mechanical and thermal stress, these antistatic plastic films according to the invention are suitable for the production of tranparent packing parts by thermoforming. The process according to the invention is furthermore suitable for the production of printing circuit boards for the electronics industry. For production, plastic sheets are printed with the thiophene derivatives of the formula (II) to be used according to the invention and with the optionally thickened solutions containing the appropriate oxidants.

The invention furthermore relates to the use of the new polythiophenes of the formula (I) as electrode material or rechargeable batteries.

The use of polythiophenes in rechargeable batteries is in itself known (see, for example, ACTUAL, CHIM. 10 (1985) 15 to 23; J. APPL. ELEKTROCHEM, 17 (1987) 607 to 612). However, in the second-named publication attention is drawn to the low stability of the polythiophenes and in SYNTH, METALS 18 (1987) 625 to 630 it is pointed out that the stability of polythiophenes when used as electrode material for rechargeable batteries is considerably lower than that of polypyrrole.

It has, however, surprisingly been found that the stability of the new poly-3,4-disubstituted thiophenes is not only considerably superior to that of the known polythiophenes but also even to that of polypyrrole and that they are therefore very suitable for use as electrode material for rechargeable batteries. It has been found that the new polythiophenes have a lower rate of self-discharge and can be re- and discharged (i.e. cyclised) more frequently than polypyrrole. This increased stability even enables the new polythiophenes to be used in aqueous electrolytic systems, such as for example in alkali batteries.

The electrochemical oxidative polymerisation of the 3,4-disubstituted thiophenes of the formula (II) can be carried out at temperatures from −78° C. up to the boiling point of the solvent employed. The electrolysis is preferably carried out at temperatures of −20° C. to 60° C.

The reaction times are from 0.5 to 24 hours, depending on the monomer, the electrolyte, the temperature of electrolysis and the current density employed.

If the thiophenes of the formula (II) are liquid the electropolymerisation can be carried out in the presence or absence of solvents which are inert under the conditions of electrolysis; the electropolymerisation of solid thiophenes of the formula (III) is carried out in the presence of solvents which are inert under the conditions of electrolysis. In particular cases it may be advantageous to use solvent mixtures and/or to add solubilisers (detergents) to the solvents.

The following may be mentioned as examples of solvents which are inert under the conditions of electrolysis; water; alcohols such as methanol and ethanol; ketones such as acetophenone; halogenated hydrocarbons such as methylene chloride, chloroform, carbon tetrachloride and fluorohydrocarbons; esters such as ethyl acetate and butyl acetate; aromatic hydrocarbons such as benzene, toluene and xylene; aliphatic hydrocarbons such as pentane, hexane, heptane and cyclohexane; nitriles such as acetonitrile and benzonitrile; sulphoxides such as dimethyl sulphoxide; sulphones such as dimethyl sulphone, phenylmethyl sulphone and sulpholane; liquid aliphatic amides such as methyl acetamide, dimethyl acetamide, dimethylformamide, pyrrolidone, N-methylpyrrolidone, caprolactam and N-methylcaprolactam; aliphatic and mixed aliphatic-aromatic ethers such as diethyl ether and anisole; and liquid ureas such as tetramethylurea or N,N-dimethylimidazolidinone.

For the electropolymerisation electrolytic additives are added to the 3,4-disubstituted thiophenes of the formula (II) or to the solutions thereof. The electrolytic additives preferably used are free acids or standard conducting salts which display a certain degree of solubility in the solvents used. The following have for example proven to be suitable as electrolytic additives: free acids such as p-toluene-sulphonic acid and methanesulphonic acid, as well as salts containing alkyl sulphonate, aryl sulphonate, tetrafluoroborate, hexafluorophosphate, perchlorate, hexafluoroantimonate, hexafluoroarsenate and hexachloroantimonate anions and alkali metal, alkaline earth metal or optionally alkylated ammonium, phosphonium, sulphonium and oxonium cations.

The electrolytic additives are used in such a quantity that a current of at least 0.1 mA flows during electrolysis.

The concentrations of the monomeric thiophenes can be between 0.01 and 100% by weight (in the case of liquid thiophene); the concentrations are preferably 0.1 to 5% by weight. The concentration of the monomers in the electrolytic solutions has an influence on the morphology of the polythiophene deposited; at low concentrations, for example of 1 g of 3 g/l of electrolytic solution, thin polymer films with a large surface area are formed, at higher concentrations thick compact polythiophene films are obtained. Polythiophene films with a large surface area have proven particularly suitable for use in batteries.

The electropolymerisation can be carried out discontinuously or continuously. Materials which have proven suitable as electrode material are the known materials such as noble metals and steel, e.g. in the form of platinum sheets, steel plates, noble metal or steel nets, carbon-black-filled polymers, metallised insulating layers, carbon felts, etc. Electrodes coated with a swellable polymer film, for example a polyvinyl chloride film, can be particularly advantageous; these swellable polymer film substrates impart particularly favourable mechanical properties on the polythiophene films deposited thereon.

The current densities for the electro-polymerisation can vary within wide limits: current densities of 0.0001 to 100, preferably 0.01 to 40 mA/cm$^2$ are usually employed. Voltages of about 0.1 to 50 V are formed at such current densities.

The thiophenes of the formula (II) can also be copolymerised with other polymerisable heterocyclic compounds, such as for example with pyrrole. It has been found that the mechanical properties of the polythiophene films can be improved without any adverse effect on their advantageous electrical properties if the alkylene dioxythiophenes of the formula (II) are copolymerised with 1 to 60% by weight of pyrrole (the percentage by weight is based on the total weight of the monomers to be polymerised). It has also been found that the electrical properties of polypyrrole films can be stabilised by copolymerising pyrrole with small quantities of about 1 to 20% by weight (the percentage by weight is based on the total weight of the monomers to be polymerised) of alkylene-dioxythiophenes of the formula (II).

The polythiophene films produced during electrolysis can be left on the electrodes if they are to be used as electrodes in rechargeable batteries; they can however also be stripped off and applied to metal nets. The polythiophenes can however also be processed into mouldings, in which case polymeric binders and, where appropriate, finely divided conductive materials such as conductive carbon blocks, conductive tin dioxide doped with indium or antimony, metal powders or metal flakes are added. These mouldings can then be inserted into the batteries.

EXAMPLE 1

Figure 1:
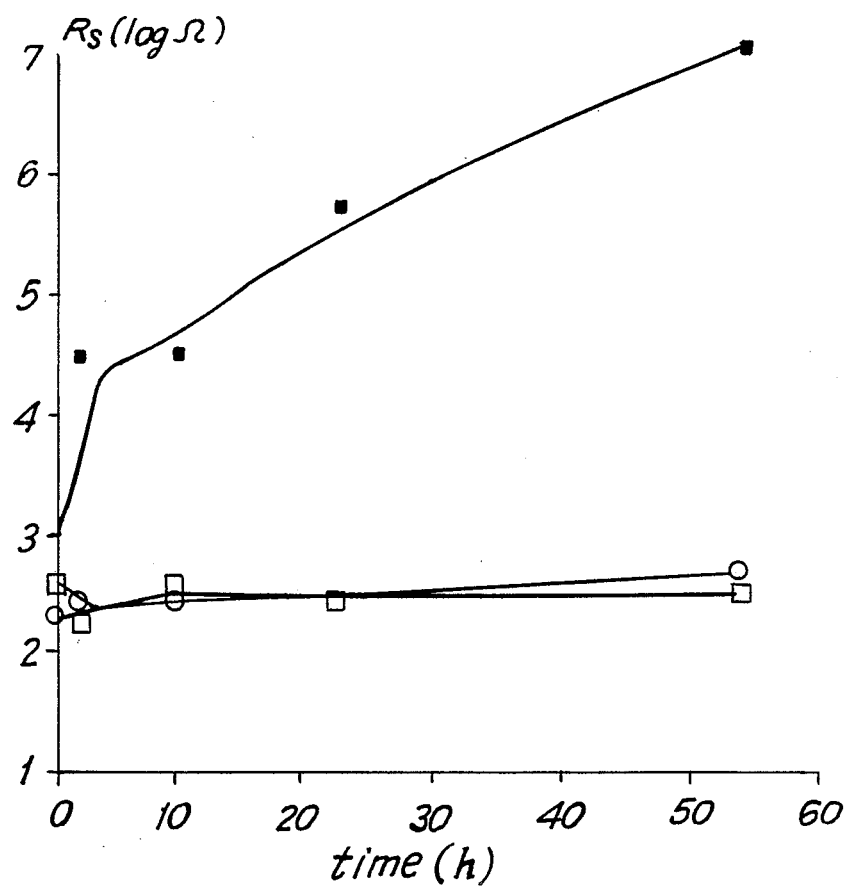
FIG. 1 is a graph depicting the surface resistance exhibited by film samples A, B and C according to Example 8, below as a function of time.

2.84 g of 3,4-ethylenedioxy-thiophene are added at 0° C. to the stirred solution of 8.11 g of FeCl$_3$ in 100 ml of acetonitrile. After stirring has been continued for a brief time, the precipitate is filtered off under suction, washed with acetonitrile and subsequently dried.

Yield: 1.1 g, electroconductity of the compressed powder disc: 2.3 S/cm (determined by the four-point method).

If 100 ml of cyclohexane are added to the greenish blue clear filtrate, a further fraction of poly(3,4-dioxyethylene)-thiophene is obtained.

Yield: 1.33 g, electroconductivity of the compressed powder disc: $3.7 \times 10^{-2}$ S/cm (determined by the four-point method).

EXAMPLE 2

The solution of 1 g of 3,4-ethylenedioxy-thiophene and 5 g of iron(III) p-toluenesulphonate in 45 g of a 1:1 mixture of isopropanol and acetone is applied to a polycarbonate film using a hand coater (wet film thickness: about 25 μm, corresponding to a dry film thickness of about 3 μm). After the solvent has been removed at room temperature, the coated film is stored for a further 12 hours. It then has a surface resistance ($R_s$) of 100Ω.

A sample of the film obtained in this way is warmed at 180° C. for 10 minutes. After cooling, the sample then has a surface resistance ($R_s$) of 60Ω.

EXAMPLE 3

The solution of 1 g of 3,4-ethylenedioxy-thiophene, 5 g of iron(III) p-toluenesulphonate and 5 g of poly(vinyl acetate) in 25 g of a 1:1 mixture of isopropanol and acetone is applied at room temperature to a polycarbonate film using a hand coater. The film is dried at room temperature to constant weight.

The film obtained in this way has a surface resistance ($R_s$) of 1000Ω.

A sample of the film is heated at 180° C. for 10 seconds; the film then has a surface resistance ($R_s$) of 120Ω. The film is transparent both at room temperature and after treatment at 180° C.

EXAMPLE 4

A solution of 1 g of 3,4-ethylenedioxy-thiophene, 2 g of iron(III) p-toluenesulphonate and 5 g of poly(vinyl acetate) in 45 g of 1:1 mixture of isopropanol and acetone is applied to a PVC film using a hand coater (wet film thickness: about 25 μm, corresponding to a dry film thickness of about 3.5 μm. The film is dried at room temperature to constant weight (15 hours). The surface resistance ($R_s$ of the film is 420Ω.

The drying time can be shortened to 1 hour by heating the solution-coated film to 50° C.

EXAMPLE 5

The suspension of 0.5 g of poly(vinyl alcohol), 0.3 g of ammonium peroxodisulphate and 0.5 g of 3,4-ethylenedioxy-thiophene in 10 ml of demineralized water is applied to a polyester filmm using a hand coater (wet film thickness: about 25 μm, corresponding to a dry film thickness of about 2.5 μm). In order to remove the water, one half of the film is stored at room temperature to constant weight (15 hours); the other half is warmed at 60° C. for 1 hour.

Both halves of the film have a surface resistance ($R_s$) of $8 \times 10^3 \Omega$.

This antistatic film is suitable, for example, as a base for photographic films.

EXAMPLE 6

A solution of 0.6 g of $FeCl_3$, 1 g of poly(vinyl acetate) and 19 g of acetone is applied to a polyamide film using a hand coater (wet films thickness: about 25 μm, corresponding to a dry film thickness of about 1 to 2 μm). After the solvent has removed (drying), the coated film is dipped for 2 seconds into a 5% strength solution of 3,4-ethylenedioxy-thiophene in a (1:1) mixture of n-hexane and of toluene. After drying at room temperature, the coated film is washed with running water until the washings contain virtually no $Fe^{+3}$ ions.

A transparent film is obtained; surface resistance ($R_s$) of the film: about $10^3 \Omega$.

EXAMPLE 7

A solution of 0.25 g of 3,4-ethylenedioxy-thiophene, 1 g of iron(III) p-toluenesulphonate and 1 g of poly(vinyl acetate) in 18 g of a 2:1 mixture of isopropanol and acetone is applied to a polycarbonate film using a hand coater (wet film thickness: about 25 μm, corresponding to a dry film thickness of 1 to 2 μm). After the solvent has been removed (drying) at 60° to 80° C., the coated film is washed with running water until the washings contain virtually no $Fe^{3+}$ ions.

A transparent film is obtained; surface resistance ($R_s$) of the film: 350Ω.

A sample of the film is heated at 180° C. for 5 seconds. The surface resistance of the film drops to $R_s$: 20Ω to this thermal treatment.

EXAMPLE 8

The solution of 10 g of poly(vinyl acetate) and 20 g of iron(III) tosylate in 100 g of isopropanol and 50 g of acetone is applied to a polycarbonate film using a hand coater (thickness 200 μm). The film is dried at room temperature to constant weight. The dry film thickness of the coating is about 1 μm.

The film coated in this way is subsequently cut into three pieces of equal size. The individual pieces are dipped for 5 seconds the 1st piece into a 5% strength solution of pyrrole in cyclohexane (film A), the second piece into a 5% strength solution of 3,4-ethylenedioxy-thiophene in cyclohexane (film B) and the 3rd piece into a 5% strength solution of 3,4-propylene-1,2-dioxy-thiophene (film C).

These three film samples A, B and C are dried at room temperature to constant weight and subsequently washed in running water until virtually no iron(III) ions can be detected in the washing water.

The film pieces A, B and C are subsequently aged in a saturated water-vapour atmosphere at 90° to 100° C. and their surface resistance is determined as a function of time. The measurement values obtained for the individual film pieces are plotted in the diagram in FIG. 1. The high hydrolysis resistance of the antistatic coatings obtained using the polythiophenes according to the invention can be seen from the curves obtained for the individual film samples. It can be seen from the diagram that the surface resistance of the Makrolon film treated with the polythiophenes according to the invention remains virtually unchanged, while the surface resistance of the Makrolon film treated with polypyrrole increases considerably after only a short time.

In another test one strip each of films A and B (each strip measuring 2 cm×5 cm) were provided with contacts of conductive silver (distance between the two contacts: 4 cm).

The two strips of films A and B, provided with the contacts were each immersed separately in a beaker filled with 1N aqueous HCl. Then the pH value of the aqueous HCl solutions was increased steadily by adding aqueous NaOH and at the same time the electrical resistance of the strips of film was determined at the various pH values. The measurements revealed that the electrical resistance of film B remained almost constant over the pH-value range of 1 to 10—the resistance only increases from $12.5 \times 12^2 \Omega$ at pH 1 to $17.5 \times 10^2 \Omega$ at pH 10—whereas the resistance of film A increases greatly, namely from $4 \times 10^5 \Omega$ at pH 1 to $5.5 \times 10^6 \Omega$ at pH 10.

EXAMPLE 9

The electrical conductivities mentioned for the polythiophenes in the following examples were, unless stated otherwise, determined by the 4-electrode method using compressed powder discs.

An electrolytic cell, equipped with two platinum electrodes was used for the electrochemical oxidation of the alkylene-dioxy thiophenes; the surface area of the individual platinum electrodes was 2×8 cm²; the distance between the electrodes was 1 cm.

This electrolytic cell is filled with a solution of 284 mg (2 mmol) of 3,4-(ethylene-1,2-dioxy)-thiophene and 1.71 g (5 mmol) of tetrabutylammonium perchlorate in 100 ml of acetonitrile. Electrolysis is carried out for 4 hours at room temperature at a constant current strength of 1.5 mA (current density: 0.094 mA/cm²). A voltage of 3.15 V forms. The polythiophene produced is deposited on the anode in the form of a blue-black coating. When electrolysis is complete the coating is washed with acetonitrile and dried in a high vacuum at 50° C.

On removing the coating mechanically from the anode 46 mg of poly-3,4-(ethylene-1,2-dioxy)-thiophene perchlorate with an electrical conductivity of about 200 S/cm are obtained.

Using the same method of procedure the solutions (2 mmol of thiophene+5 mmol of electrolyte in 100 ml of acetonitrile) of the thiophenes and electrolytes mentioned in the following table were electrolysed in the above-described electrolytic cell at a constant current strength of 1.5 mA and a current density of 0.094 mA/cm² at the temperatures mentioned in the table. The blue-black polythiophene coatings obtained during the electrolysis were worked up as described above. The voltages which form during electrolysis, the duration of electrolysis, the yields of polythiophenes and the electrical conductivities of the polythiophenes obtained are summarised in the following table.

250 ml of acetonitrile. The carbon felt electrode is arranged as the anode. Electrolysis is carried out for 2 hours at a constant current density of 5 mA/cm². When electrolysis is complete the blue-black coating deposited on the anode is washed with acetonitrile and dried at 50° C. in a high vacuum.

On careful mechanical separation of the coating formed, 66 mg of poly-3,4-(ethylene-1,2-dioxy)-thiophene tetrafluoroborate with a conductivity of 31 S/cm are obtained.

EXAMPLE 22

An electrolytic cell equipped with two platinum electrodes (surface area of the individual electrodes: 2×8 cm²; distance between electrodes: 1 cm) is filled with a solution of 284 mg (2 mmol) of 3,4-(ethylene-1,2-dioxy)-thiophene and 1.71 g (5 mmol) of tetrabutylammonium perchlorate in 100 ml of acetonitrile. The platinum electrode arranged as the anode is coated with a polyvinyl chloride film of a thickness of 0.06 mm.

Electrolysis is carried out for 24 hours at a temperature of 20° C. and a constant current strength of 1.5 mA (current density: 0.094 mA/cm²), a voltage of 2.1 V being formed.

The blue transparent film formed on the anode during electrolysis is stripped from the electrode after drying in a high vacuum at 50° C.

A cross-sectional photograph of this film shows that a 0.002 mm thick layer of poly-3,4-(ethylene-1,2-dioxy)-thiophene perchlorate has formed within the polyvinyl chloride film on the side facing the electrode. The conductivity of this layer is 200 S/cm (determined by the

TABLE

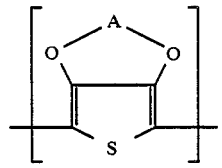

| Example | A | Elektrolyte cation | Elektrolyte anion | Temperature of electrolysis [°C.] | Voltage formed [V] | Duration of electrolysis [h] |
|---|---|---|---|---|---|---|
| 10 | —CH$_2$—CH$_2$— | (C$_4$H$_9$)$_4$N$^\oplus$ | ClO$_4^\ominus$ | RT | 3.45 | 24 |
| 11 | —CH$_2$—CH$_2$— | (C$_4$H$_9$)$_4$N$^\oplus$ | PF$_6$ | RT | 3.36 | 4 |
| 12 | —CH$_2$—CH$_2$— | (C$_4$H$_9$)$_4$N$^\oplus$ | BF$^4$ | RT | 3.36 | 4 |
| 13 | —CH$_2$—CH$_2$— | H$^\oplus$ | CH$_3$—C$_6$H$_4$—SO$_3^\ominus$ | RT | 1.3 | 4 |
| 14 | —CH$_2$—CH$_2$— | Na$^\oplus$ | BF$_4^\ominus$ | RT | 1.89 | 60 |
| 15 | —CH$_2$—CH(CH$_3$)— | (C$_4$H$_9$)$_4$N$^\oplus$ | PF$_6^\ominus$ | RT | 2.6 | 24 |
| 16 | —CH$_2$—CH(C$_6$H$_{13}$)— | (C$_4$H$_9$)$_4$N$^\oplus$ | ClO$_4^\ominus$ | RT | 2.55 | 24 |
| 17 | —CH$_2$—CH(C$_{10}$H$_{21}$)— | (C$_4$H$_9$)$_4$N$^\oplus$ | ClO$_4^\ominus$ | RT | 3.06 | 24 |
| 18 | —CH$_2$—CH$_2$— | (C$_4$H$_9$)$_4$N$^\oplus$ | ClO$_4^\ominus$ | −20 | 3.19 | 18 |
| 19 | —CH$_2$—CH$_2$— | (C$_4$H$_9$)$_4$N$^\oplus$ | ClO$_4^\ominus$ | 0 | 3.27 | 24 |
| 20 | —CH$_2$—CH$_2$— | (C$_4$H$_9$)$_4$N$^\oplus$ | ClO$_4^\ominus$ | −40 | 3.17 | 24 |

EXAMPLE 21

An electrolytic cell equipped with a platinum electrode (electrode surface area 4×4 cm²) and a carbon felt electrode SPC 7016 (0.05 kg/m², made by the Sigri company) with the same surface area (distance between electrodes: 2 cm) is filled with a solution of 5.68 g (40 mmol) of 3,4-(ethylene-1,2-dioxy)-thiophene and 4.34 g (20 mmol) of tetraethylammonium tetrafluoroborate in 4-electrode method on the side of the film facing the electrode).

EXAMPLE 23

((Cyclovoltametric determination of the capacity of the poly-3,4-(ethylene-1,2-dioxy)-thiophene films for absorbing and releasing electric charges (re- and dischargeability)).

A film of poly-3,4-(ethylene-1,2-dioxy)-thiophene hexafluorophosphate produced by the electrochemical oxidation of 3,4-(ethylene-1,2-dioxy)-thiophene carried out galvanostatically using a current density of 0.5 mA/cm$^2$ was used for the determination; the electrode coated with this film was arranged in a 0.1 molar solution of tetrabutylammonium hexafluorophosphate in propylene carbonate.

Figure 2:
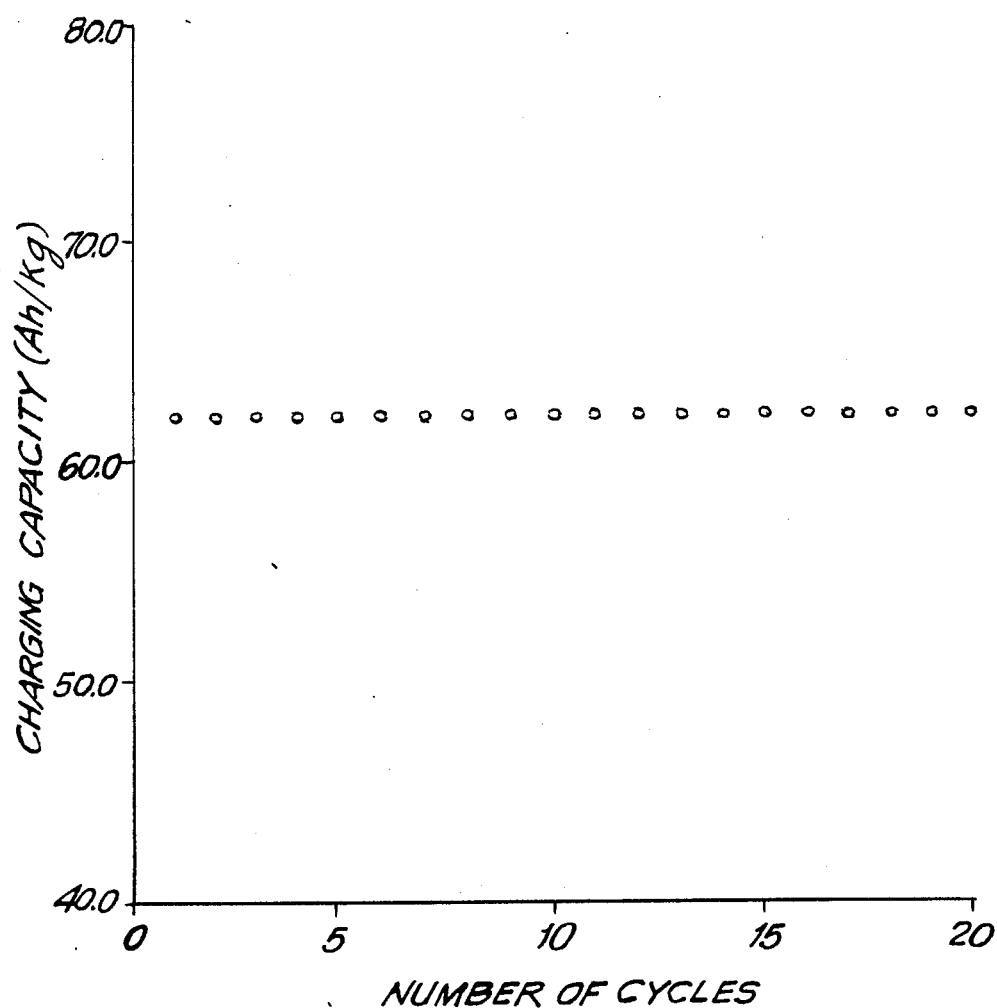
FIG. 2 is a graph depicting the charging capacity of the polymer film according to Example 23, below, as a function of the number of charge and discharge cycles.

In the cyclovoltametric measurement the polymer film displayed an oxidation peak at +0.120 V and a reduction peak at −0.457 V (compared with Ag/AgCl) at a feed rate of 10 mV/S. The cyclovoltametric measurement revealed that the polymer film can be reversibly charged and discharged (cyclised) in the range between −1.28 V and +1.42 V (compared with Ag/AgCl) at a feed rate of 0.5 mV/S with a charge loss of only approximately 0.01% per cycle. The degree of charging is 33 mol % and the charging capacity is 62 Ah/kg based on the neutral polymer. The very low self-discharging rate of the film shows that, in the charged state, it is not changed by overoxidation effects or by additional side reactions. In the diagram shown in FIG. 2 the charging capacity of the polymer film is recorded as a function of the number of charges and discharges (cycles). It is clear from the position of the measuring points in the diagram that the charging capacity has hardly changed at all after 15 cycles.

In polypyrrole films which have been produced and cyclised under identical conditions a similar degree of charging (30 mol%) is generally obtained as with poly-3,4-(ethylene-1,2-dioxy)-thiophene. The charge losses during charging and discharging at between −1.28 V and 1.42 V are however considerable and are 5% per cycle.

In a second test series a 0.1 molar solution of lithium perchlorate in water was used as the electrolyte instead of the 0.1 molar solution of tetrabutylammonium hexafluorophosphate in propylene carbonate.

Equal success was obtained on charging and discharging the polymer film in this electrolyte. Although the discharge current decreased slightly after the first few cycles it reached a constant value after about 30 cycles. It was only possible to cyclise a comparable polypyrrole film twice under the same conditions.

In a third test series a film of poly-3,4-(ethylene-1,2-dioxy)-thiophene hexafluorophate produced by the electrochemical oxidation of 3,4-(ethylene-1,2-dioxy)-thiophene carried out potentiostatically at +1.6 V (compared with Ag/AgCl) at an average current density of 0.5 mA/cm$^2$ was used. The Pt electrode coated with the film was arranged in a 0.1 molar solution of tetrabutylammonium hexafluorophosphate in methylene chloride. The charging and discharging of the film was determined cyclovoltrametrically at between −1.10 V and +1.70 V at a feed rate of 2 mV/S. A degree of charging of 41 mol% was obtained. This corresponds to a charging capacity of 77 Ah/kg. The charge losses per cycle are 0.06%. The higher charging capacity is only associated with a slight increase in the loss rate. A charge loss of 15% for each cycle was obtained for polypyrrole films charged and discharged under the same conditions.

What is claimed is:

1. A polythiophene containing structural units of the formula

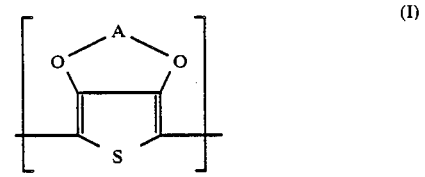

in which
A is an C$_1$–C$_4$-alkylene radical or a substituted C$_1$–C$_4$-alkylene radical.

2. The polythiophene of claim 1 wherein A is a methylene radical, an alkyl-substituted methylene radical, an 1,2-ethylene radical, an 1,2-ethylene radical which is substituted by C$_1$–C$_{12}$-alkyl or phenyl or a 1,2-cyclohexylene radical.

3. The polythiophene of claim 1 wherein A is a methylene, 1,2-ethylene or 1,2-propylene radical.

4. The polythiophene of claim 1 which consists of the structural units of formula (I).

* * * * *